United States Patent
Jang

(10) Patent No.: US 9,516,453 B2
(45) Date of Patent: Dec. 6, 2016

(54) COMMUNICATION CONNECTION METHOD IN BLUETOOTH DEVICE AND APPARATUS THERETO

(71) Applicant: Samsung Electronics Co., Ltd., Suwon-si, Gyeonggi-do (KR)

(72) Inventor: Jin-Ho Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/209,149

(22) Filed: Mar. 13, 2014

(65) Prior Publication Data

US 2014/0273855 A1    Sep. 18, 2014

(30) Foreign Application Priority Data

Mar. 14, 2013  (KR) .................. 10-2013-0027573

(51) Int. Cl.
| | |
|---|---|
| H04W 4/00 | (2009.01) |
| H04L 29/08 | (2006.01) |
| H04W 76/02 | (2009.01) |
| H04W 12/06 | (2009.01) |
| H04W 76/06 | (2009.01) |
| H04W 84/18 | (2009.01) |

(52) U.S. Cl.
CPC ............ *H04W 4/008* (2013.01); *H04L 67/303* (2013.01); *H04W 12/06* (2013.01); *H04W 76/023* (2013.01); *H04W 76/068* (2013.01); *H04W 84/18* (2013.01)

(58) Field of Classification Search
CPC .............................. G07C 5/008; H04W 4/008
USPC ............................................... 455/41.1, 41.2
See application file for complete search history.

(56) References Cited

U.S. PATENT DOCUMENTS

| | | | |
|---|---|---|---|
| 7,823,214 B2 * | 10/2010 | Rubinstein et al. ............ 726/34 |
| 8,639,187 B2 * | 1/2014 | Satoh ....................... H04B 5/02 |
| | | | 455/41.2 |
| 2004/0203694 A1 * | 10/2004 | Wong et al. .................. 455/419 |
| 2006/0156415 A1 | 7/2006 | Rubinstein et al. |
| 2013/0054470 A1 * | 2/2013 | Campos et al. ................ 705/67 |

* cited by examiner

*Primary Examiner* — Tuan H Nguyen
(74) *Attorney, Agent, or Firm* — Jefferson IP Law, LLP

(57) ABSTRACT

A BLUETOOTH communication connection method of a host device communicating with an external device is provided. The method includes determining whether a device to be connected among scanned external devices comprises a predetermined profile based device, and transmitting, by the host device, predetermined identification information to a corresponding connected device when the device to be connected comprises the predetermined profile-based device.

19 Claims, 4 Drawing Sheets

COMMUNICATION CONNECTION METHOD IN BLUETOOTH DEVICE AND APPARATUS THERETO

CROSS-REFERENCE TO RELATED APPLICATION(S)

This application claims the benefit under 35 U.S.C. §119(a) of a Korean patent application filed on Mar. 14, 2013 in the Korean Intellectual Property Office and assigned Serial number 10-2013-0027573, the entire disclosure of which is hereby incorporated by reference.

TECHNICAL FIELD

The present disclosure relates to a BLUETOOTH communication technology. More particularly, the present disclosure relates to a communication connection method between devices performing BLUETOOTH communication and an apparatus thereto.

BACKGROUND

Recently, a communication terminal such as a smart phone, a tablet Personal Computer (PC), and the like combining a function of a portable terminal and a function of a Personal Digital Assistant (PDA) is a developing trend in consumer devices. The smart phone or the tablet PC has a large memory and a high performance Central Processing Unit (CPU) compared to a conventional memory and CPU, and an Operating System (OS) for supporting various application executions, a voice/data communication, a PC interlocking, and the like.

There are many cases of connecting and using a separate input-output device in using the smart phone or the tablet PC. Especially, external devices such as a BLUETOOTH communication based BLUETOOTH headset, BLUETOOTH hands-free, BLUETOOTH speaker, BLUETOOTH keyboard, BLUETOOTH mouse, BLUETOOTH game pad, and the like have been developed. The external device periodically transmits data to a host function of the smart phone, the tablet PC, and the like through BLUETOOTH communication, and the host device receives data through BLUETOOTH communication and processes the received data.

The external device which performs BLUETOOTH communication with the host device transmits and receives a signal by various communication profile standards, respectively. For example, a mouse, a keyboard, a game pad, and the like may be based on a Human Interface Device (HID) profile, an audio speaker may be based on an Advanced Audio Distribution Profile (A2DP), a hands-free device may be based on Hands Free Profile (HFP), and a headset may be based on a Head Set Profile (HSP).

Meanwhile, in a communication technology between the host device and the external device, an external device (hereinafter, referred to as an "HID device") that performs BLUETOOTH communication through an HID profile has been recently designed as a universal device, due to the nature of the external device, so that providing a specific service by a service provider has become difficult. For example, a scheme in which a user manually and directly operates and controls a device so as to change a service is provided.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a communication connection method in a BLUETOOTH device in which a specialized service by a service provider is conveniently provided, and a service is automatically changed and provided in a device and an apparatus connected thereto.

In accordance with an aspect of the present disclosure, a BLUETOOTH communication connection method for a host device to communicate with an external device is provided. The method includes determining whether a device to be connected among scanned external devices is a predetermined profile based device, and transmitting, by the host device, predetermined identification information to a corresponding connected device when the device to be connected is the predetermined profile-based device.

The identification information of the host device may be selectively transmitted according to whether an identity of a corresponding device has an authenticated qualification depending on identification information of the device to be connected when the identification information of the host device is transmitted from the host device to the corresponding connected device.

In accordance with an aspect of the present disclosure, a BLUETOOTH communication connection method for an external device to communicate with a host device is provided. The method includes, after establishing a BLUETOOTH communication connection according to a host device and a predetermined profile, determining whether identification information of a corresponding host device is transmitted from the connected host device during a predetermined time, and during the predetermined time, releasing a connection when the identification information of the host device has been not transmitted, and performing a BLUETOOTH communication when the identification information of the host device has been transmitted.

When the identification information of the external device is transmitted to the host device during the predetermined time, the identification information of the host device may be identified to determine whether an identity of a corresponding host device has an authenticated qualification, and a connection may be released when the identity of the host device does not have the authenticated qualification.

The identification information of the external device may include information of a Vendor ID (VID) and a Product ID (PID).

The authenticated qualification may correspond to an identical service provider.

In accordance with an aspect of the present disclosure, a host device for performing a BLUETOOTH communication connection with an external device is provided. The host device includes a BLUETOOTH communication unit that performs BLUETOOTH communication with the external device, and a controller that controls a BLUETOOTH communication unit so as to control an overall operation of the BLUETOOTH communication and when a device to be connected among the external devices is a device of a predetermined profile, controls an operation of transmitting, by the host device, predetermined identification information to the corresponding connected device through the BLUETOOTH communication.

In accordance with an aspect of the present disclosure, an external device for performing a BLUETOOTH communication connection with a host device is provided. The external device includes a BLUETOOTH communication unit that performs BLUETOOTH communication with the host device, and a controller that controls a BLUETOOTH communication unit so as to control an overall operation of BLUETOOTH communication, releases a connection when identification information of a corresponding host device has not been transmitted during the predetermined time after a BLUETOOTH communication connection according to a host device and a predetermined profile, and controls an operation of performing the BLUETOOTH communication when the identification information of the host device has been transmitted.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
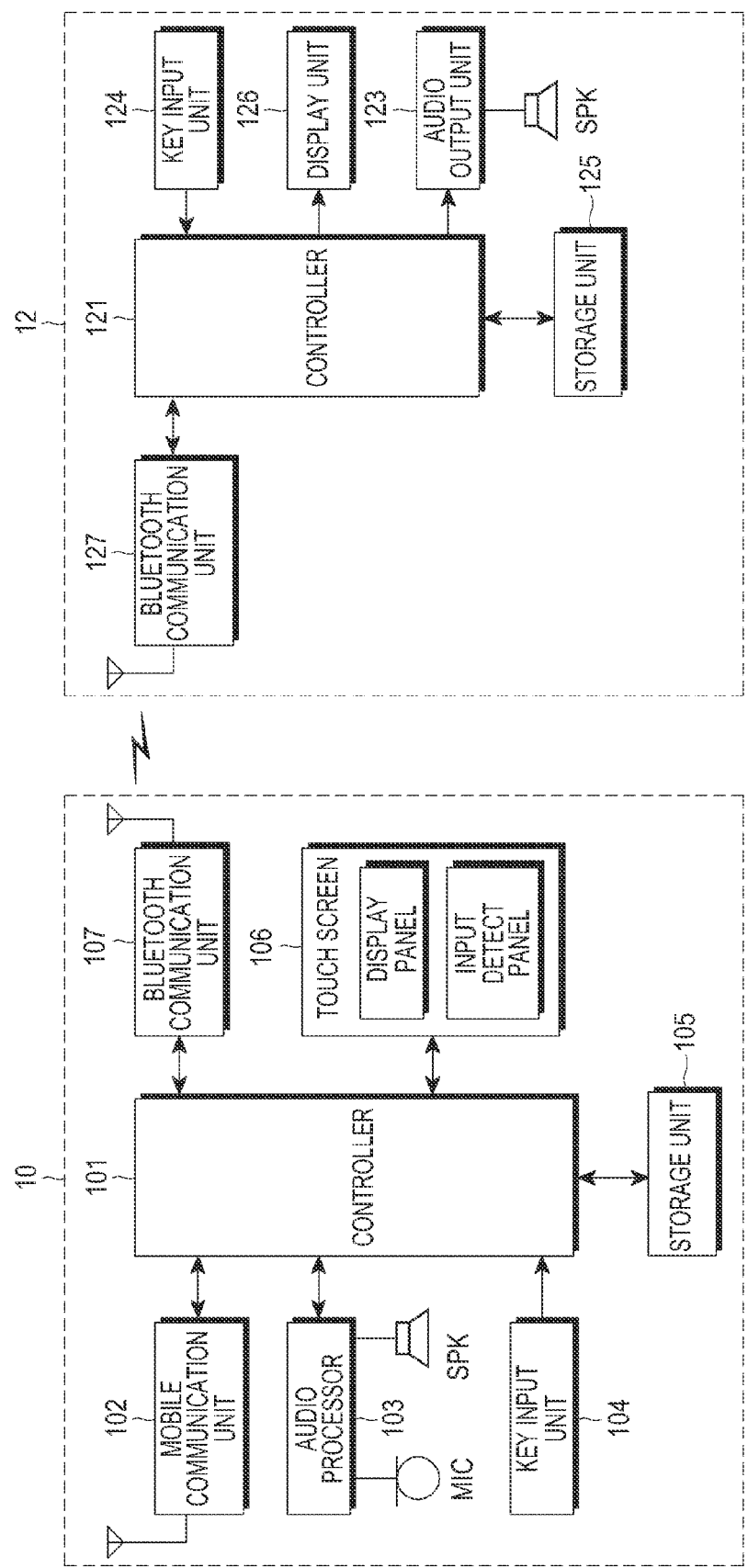
FIG. 1 is a schematic block diagram illustrating a host device and an external device which perform BLUETOOTH communication according to an embodiment of the present disclosure.

FIG. 1 is a schematic block diagram illustrating a host device and an external device which perform BLUETOOTH communication according to an embodiment of the present disclosure.

Referring to FIG. 1, an external device 12 according to the embodiment of the present disclosure is as a device performing BLUETOOTH communication through a Human Interface Device (HID) profile and may be for example, a game pad. A host device 10 may be a portable terminal such as a smart phone, and the like.

In a detailed description of the host device 10, the host device 10 includes a controller 101, a mobile communication unit 102, an audio processor 103, a key input unit 104, a storage unit 105, a touch screen 106, and a BLUETOOTH communication unit 107.

The mobile communication unit 102 of the host device 10 may be included when a host device 10 which is a portable terminal supports a mobile communication function. Specifically, in order to perform an operation of transmitting, receiving and processing a wireless signal for the mobile communication function, the mobile communication unit may include an antenna, a Radio Frequency (RF) signal processor, a modulator-demodulator (modem), and the like.

The audio processor 103 may include a speaker (SPK) for outputting an audio signal of the portable terminal and a microphone (MIC) for collecting an audio signal. Further, the audio processor 130 may include a voice coder-decoder (codec) processing an audio signal which is input and output through the SPK and the MIC, and the like. When performing a telephone conversation according to the mobile communication function, the audio processor 130 receives a voice input of a user or outputs an audible sound to the user, and also outputs effect sounds corresponding to various operations or sounds corresponding to various digital audio contents, video contents, and the like.

The key input unit 104 of the host device 10 may include keys for operating a plurality of operations, mechanically included in an appearance housing of a corresponding portable terminal, and receives an input of a user operation. The key as described above may include a side key, a touch pad separately provided, and the like.

The touch screen 106 may include a display panel performing a display function to output information output in the portable terminal, and an input sensing panel performing various input functions input by the user. The display panel may be configured as a Liquid Crystal Display (LCD), an Organic Light Emitting Diode (OLED), a Passive-Matrix OLED (PMOLED), or an Active-Matrix OLED (AMOLED) screen and may be structurally and collectively implemented with the input sensing panel. The display panel may display various screens according to diverse operation states, a menu state, an execution and service of an application, and the like of the corresponding portable terminal. The input sensing panel may include one or more panels which can sense a connection and non-connection touch input by a finger, an electronic pen, and the like.

The BLUETOOTH communication unit 107 performs BLUETOOTH communication with the external device as described above. That is, the BLUETOOTH communication unit 107 performs a Service Link Connection (SLC), Synchronous Connection Oriented (SCO), and Asynchronous Connection Less (ACL) in order to perform a function for forming a channel with a BLUETOOTH device to be generally connected.

The storage unit 105 is configured to store various programs and data required for portable terminal management. For example, the storage unit 105 may include program memories and data memories for storing various applications and contents related thereto, data related to an operation process, and the like. Especially, the storage unit 105 stores an operation program and related information for performing BLUETOOTH communication according to the present disclosure.

The controller 101 controls an overall operation of the portable terminal by generally controlling the each function unit. In addition, according to the present disclosure, the controller 101 controls a BLUETOOTH communication operation and a detailed operation of the controller 101 will be discussed through an embodiment of the present disclosure.

The portable terminal may be implemented as the host device 10 according to the embodiment of the present disclosure by including the components as described above. Furthermore, the portable terminal may be configured with a rechargeable battery and the like so that a power unit (not shown) which provides an operation power to each inner function unit is fundamentally included. Also, function units applied to a present mobile communication terminal such as a Global Positioning System (GPS) unit, a motion sensor, a vibration motor, a camera module, and the like may be basically included or more added. Further, the portable terminal as shown in FIG. 1 represents a structure corresponding to, for example, a smart phone, a mobile phone, and the like. Further, the portable terminal applied to the present disclosure may be diversely configured in the form of a Portable Multimedia Player (PMP), a Personal Digital Assistant (PDA), a Motion Picture Experts Group (MPEG)-2 Audio Layer III (MP3) player, a tablet Personal Computer (PC), a personal navigation device, a portable game machine, and the like. In this event, the mobile communication unit 102, and the like illustrated in FIG. 1 may be omitted.

Next, in a detailed construction of the external device 12, the external device 12 includes a controller 121, an audio output unit 123, a key input unit 124, a storage unit 125, a display unit 126, and a BLUETOOTH communication unit 127.

The BLUETOOTH communication unit 127 of the external device 12 performs BLUETOOTH communication with the host device 10. When the external device 12 is, for example, a game pad, the BLUETOOTH communication unit 127 performs BLUETOOTH communication according to an HID profile.

The audio output 123 may include a SPK for outputting an audio signal of the game pad and a voice codec for processing the output audio signal, and outputs sounds corresponding to an effect sound by executing a game or various execution contents.

The key input unit 124 of the external device 12 may include keys for operating a plurality of operations, as well as a joystick key mechanically included in an appearance housing of a corresponding game pad, and receives an input of a user operation.

The display unit 125 includes a small sized LCD panel or LED elements and may display various display contents depending on diverse operation states, an operation execution and service, and the like.

For example, the storage unit 125 of the external device 12 may include program memories and data memories for storing various applications and related contents required for the game pad operations, data related to an operation process, and the like. Especially, the storage unit 105 stores an operation program and related information for performing BLUETOOTH communication according to the present disclosure.

The controller 121 of the external device 12 controls an overall operation of the game pad by generally controlling each function unit. In addition, according to the present disclosure, the controller 121 controls a BLUETOOTH communication operation and a detailed operation of the controller 121 will be discussed through an embodiment of the present disclosure.

A game pad may be implemented as the external device 12 according to the embodiment of the present disclosure by including the components as described above. Furthermore, the game pad may be configured with a rechargeable battery and the like so that a power unit (not shown) which provides an operation power to each inner function unit of the external device 12 is fundamentally included. Also, function units such as a motion sensor for capturing a user's motion operation, a vibration motor for generating vibration effects, and the like may be basically included or additionally added. Further, in some cases, the display unit 126, the audio output unit 123, and the like may be omitted. Even though the external device 12 illustrated in FIG. 1 has been discussed as an example of a structure corresponding to the game pad, the external device applied to the present disclosure may be any device which performs an HID profile-based BLUETOOTH communication such as a keyboard, a mouse, and the like.

Figure 2:
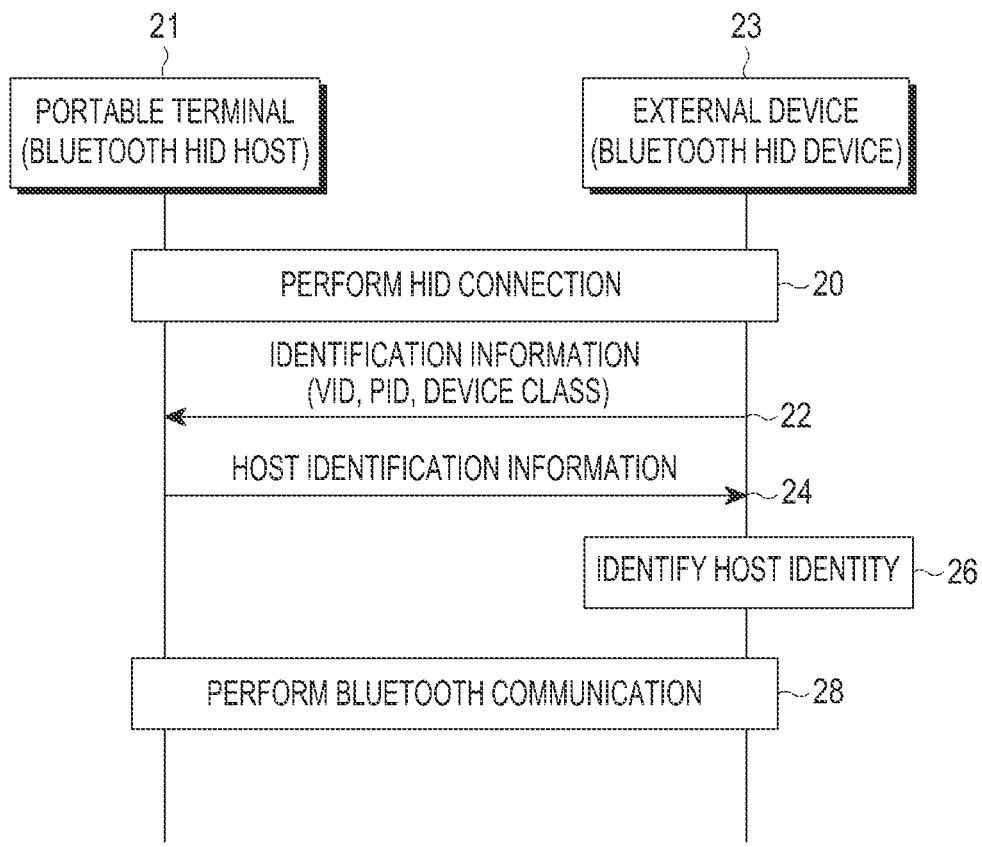
FIG. 2 is a flowchart illustrating a communication operation between a host device and an external device which perform BLUETOOTH communication according to an embodiment of the present disclosure.

FIG. 2 is a flowchart illustrating a communication operation between a host device (portable terminal) and an external device (game pad) which perform BLUETOOTH communication according to an embodiment of the present disclosure, and may be, for example, an operation process of BLUETOOTH communication between the host device 10 and the external device 12 illustrated in FIG. 1.

Referring to FIG. 2, in operation 20, a connection between a host device 21 and an external device 23 according to the present disclosure is formed by an HID profile through the BLUETOOTH communication process. A communication process according to BLUETOOTH standard 3.0 may be performed, or a communication process according to BLUETOOTH standard 4.0/BLUETOOTH Low Energy (BLE) may be performed. For example, according to a present HID profile, when connecting BLUETOOTH communication, class information of a device connected by the HID profile, Vendor ID (VID) information and Product ID (PID) information are provided.

When the communication connection according to the HID profile is formed in operation 20, the external device 23 transmits its own identification information (e.g., VID, PID, Device class), and the like to the host device 21 in operation 22. In operation 22, a process of transmitting unique identification information from the external device 23 to the host device 21 may be performed in a process of forming the communication connection according to the HID profile and may be omitted in another embodiment of the present disclosure.

In operation 24, the external device 23 connected to the current BLUETOOTH communication is an HID profile-based device so that the host device 21 provides host identification information corresponding to its own identification information to the external device 23. In this event, the host device 21 checks identification information (e.g., VID, PID) which can identify a service provider of the HID device and may send its own identification information, for example, "Samsung Android Phone" value by ASCII code or "single HEX character" format.

Meanwhile, at a time in which an operation of operation 24 is performed, when the connected external device 23 is an HID device, the host device 21 may perform an operation of immediately transmitting its own identification information. In addition, the host device 21 may identify the corresponding external device 23 from identification information of a currently connected external device and selectively perform an operation of transmitting its own identification information. For example, the host device 21 may identify service provider information of the external device 23 and perform the operation of transmitting its own identification information when the service provider of the external device 23 has a predetermined authenticated qualification (e.g., a service provider of both the host device 21 and the external device 23 being identical).

For example, the VID is a value which is previously allocated by each manufacturer and "Samsung Electronics" may use a value "0x04E8". The PID is a value which is allocated by a product or a product group, one by one, and may have a value "0x7021". Therefore, when the host device 21 is a device having the PID corresponding to a band "0xA000-0xA2FF" including a value "0x7021" by separating the PID band, the host device 21 may be considered to have the predetermined authenticated qualification.

The external device 23 identifies the identity of the host device 21, from the identification information transmitted from the host device 21, in operation 26. When the external device 23 has the predetermined authenticated qualification (for example, a service provider of both the host device 21 and the external device 23 being identical), operation 28 is proceeded to and communication with the host device 21 is performed.

Figure 3:
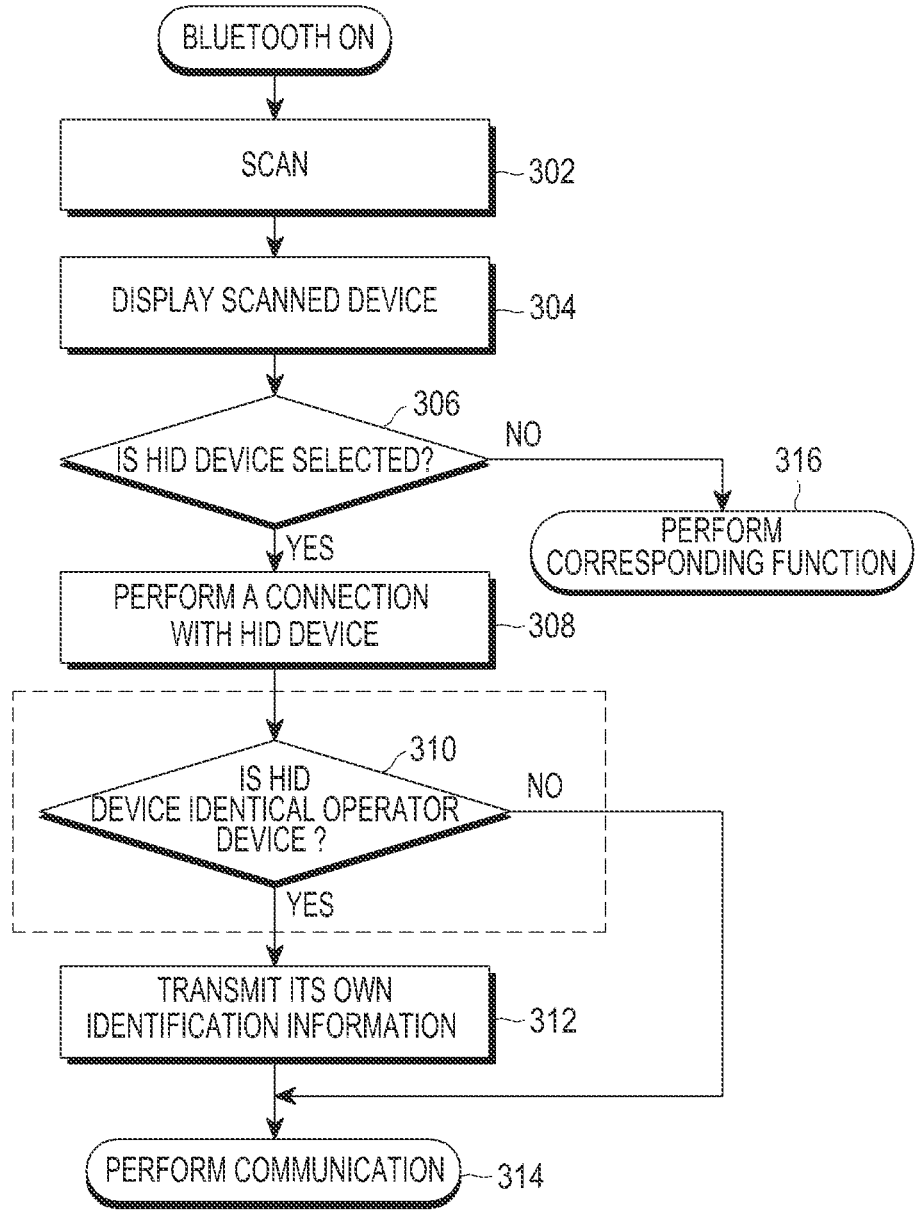
FIG. 3 is a flowchart illustrating an operation of a host device which performs BLUETOOTH communication according to an embodiment of the present disclosure.

FIG. 3 is a flowchart illustrating an operation of a host device which performs BLUETOOTH communication according to an embodiment of the present disclosure and, for example, may correspond to the BLUETOOTH communication operation in respect to the host device 21 shown in FIG. 2.

Referring to FIG. 3, when BLUETOOTH is on, the host device performs a general BLUETOOTH inquiry process and performs a scan operation of identifying external devices in operation 302. Information of the scanned external devices is displayed on a screen with a list type and the like, and a device desired to be connected is selectable according to an operation such as a user's touch input and the like, in operation 304. Further, in operation 304, when the information of the scanned external devices is displayed on the screen with a list type and the like, an HID profile-based device may be separated and displayed with other profile-based devices, or only the HID profile-based device may be extracted and displayed.

When the HID profile-based device has been selected by the user's selection operation in operation 306, operation 308 is proceeded to. When the HID profile-based device has been not selected or operations of other functions are input, a corresponding function is performed in operation 316.

In operation 308, a connection with a corresponding selected HID device is formed by performing a general BLUETOOTH pairing process. In operation 310, it is determined whether the connected HID device is an identical provider device, and when the connected HID device is the identical provider device, operation 312 is proceeded to. In operation 312, identification information of the host device is transmitted to the HID device and then BLUETOOTH communication is performed in operation 314.

Operation 310 may be optionally performed according to an embodiment (as indicated by a dotted line in FIG. 3). When the connection with the HID device is formed, identification information of the host device may be transmitted to the HID device. In operation 310, when the HID device is not the identical provider device, identification information of the host device is not transmitted and BLUETOOTH communication is immediately performed in operation 314. However, as described below, the HID device does not receive identification information of the host device or identifies identification information transmitted from the host device. When the host device does not have an authenticated qualification, the HID device performs an operation of releasing the connection and terminates the BLUETOOTH communication operation.

Figure 4:
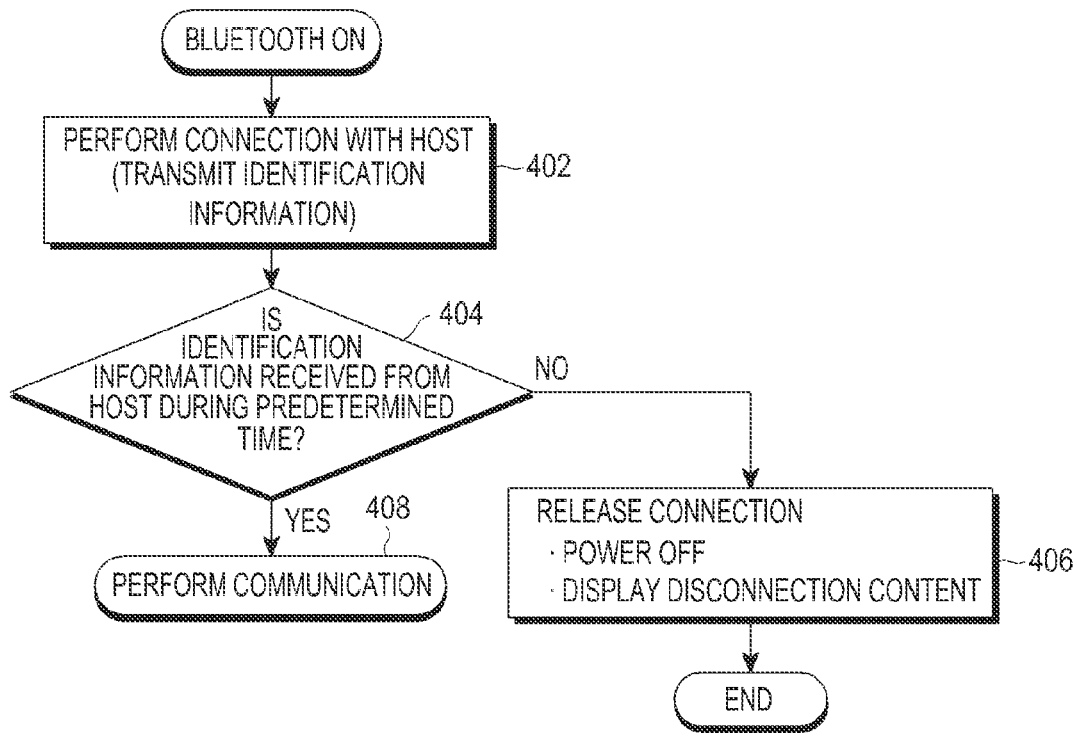
FIG. 4 is a flowchart illustrating an operation of an external device which performs BLUETOOTH communication according to an embodiment of the present disclosure.

FIG. 4 is a flowchart illustrating an operation of an external device which perform BLUETOOTH communication according to an embodiment of the present disclosure and, for example, may correspond to the BLUETOOTH communication operation of the host device 21 as shown in FIG. 2.

Referring to FIG. 4, when the external device (i.e., a HID device) is in a state in which BLUETOOTH is on, a connection with the host device is formed by performing an inquiry process and a paring process in operation 402. In this event, identification information of the external device may be transmitted to the host device.

When the connection is formed in operation 402, the host device waits for a predetermined time (e.g., 250 ms) and it is determined in operation 404 whether identification information is transmitted to the host device. When the identification information has been received by the host device during the predetermined time, a normal BLUETOOTH communication operation is performed in operation 408. When the identification information has been not received by the host device within the predetermined time, operation 406 is proceeded to and performs an operation of releasing the BLUETOOTH connection. In this event, a power off operation of a corresponding external device may be combined with the operation of releasing the BLUETOOTH connection. In addition, a disconnection notification of a predetermined proper content may be output through the display unit or the audio output unit in order to notify of releasing the connection to the user.

As described in an operation shown in FIG. 4, when the identification information has been received from the host device within the predetermined time, the external device immediately performs normal communication. This is a configuration in which the host device identifies that a corresponding external device is an identical provider device and is a possible operation of implementing the embodiment of the present disclosure. In another embodiment of the present disclosure, when identification information of the external device is immediately transmitted without determining whether the external device connected to the host device is an identical provider device, the external device, for example, should additionally perform an operation of identifying the host device according to the received identification information of the host device after operation 404. Therefore, when the host device does not have the authenticated qualification, operation 406 is proceeded to and may be implemented by performing the BLUETOOTH connection release operation.

Further, at the time of receiving identification information of the host device, the external device may additionally perform an operation of providing an Acknowledgement (ACK) signal thereof to the host device.

As described above, in a BLUETOOTH device according to the present disclosure, a communication connection scheme may conveniently provide a specialized service by a service provider, and enables that a service may be automatically changed and provided to the device.

The BLUETOOTH device according to the present disclosure may provide a communication connection scheme. Meanwhile, the description has been discussed with reference to specific embodiments of the present disclosure. Furthermore, there may be various embodiments and modified embodiments of the present disclosure.

For example, the BLUETOOTH communication connection and release operations with respect to the HID profile based device have been discussed, and also the present disclosure may be applied to BLUETOOTH communication connection and release operations with respect to other profiles-based devices.

It will be appreciated that the various embodiments of the present disclosure may be implemented in a form of hardware, software, and a combination of hardware and software. Any such software may be stored, for example, in a volatile or non-volatile storage device such as a Read Only Memory (ROM), a Random Access Memory (RAM), a memory chip, a memory device, or a memory Integrated Circuit (IC), or a recordable optical or magnetic medium such as a Compact Disk (CD), a Digital Versatile Disk (DVD), a magnetic disk, or a magnetic tape, regardless of an ability to be erased or to be re-recorded. It will be appreciated that a memory, which may be incorporated in a portable terminal, may be an example of a non-transitory machine-readable storage medium which is suitable for storing a program or programs including commands to implement the various embodiments of the present disclosure. Accordingly, the present disclosure includes a non-transitory computer readable storage medium on which is stored a program that includes a code for implementing an apparatus or a method defined in any claim in the present disclosure. Further, the program may be electronically transferred by any communication signal through a wired or wireless connection, and the present disclosure appropriately includes equivalents of the program stored in any medium, including distributed storage, for any period of time.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A BLUETOOTH (BT) communication connection method of a host device communicating with an external device, the method comprising:
   establishing, by performing a general BT pairing process, the BT communication connection with the external device which performs a Human Interface Device (HID) profile-based BT communication;
   determining whether an identify of the external device comprises an authenticated qualification depending on identification information of the external device; and
   transmitting, by the host device, predetermined identification information to the external device and performing the HID profile-based BT communication with the external device when the external device comprises the authenticated qualification; and
   performing, by the host device, the HID profile-based BT communication with the external device without transmitting the predetermined identification information to the external device when the external device does not comprise the authenticated qualification.

2. The method of claim 1, wherein the identification information of the device to be connected comprises information of a Vendor ID (VID) and a Product ID (PID).

3. The method of claim 1, wherein the authenticated qualification comprises an identical service provider.

4. The method of claim 3, wherein information of a Vendor ID (VID) and a Product ID (PID) identify the identical service provider.

5. A non-transitory computer readable storage medium encoded with instructions to perform the method of claim 1.

6. A BLUETOOTH (BT) communication connection method for an external device communicating with a host device, the method comprising:
   establishing, by performing a general BT pairing process, the BT communication connection with the host device according to a Human Interface Device (HID) profile-based BT communication;
   after establishing the BT communication connection with the host device, determining, by the external device which performs the HID profile-based BT communication, whether identification information of the host device is transmitted from the host device during a predetermined time; and
   during the predetermined time, releasing the BT communication connection and performing a power off operation when the identification information of the host device has been not transmitted, and performing a BT communication when the identification information of the host device has been transmitted.

7. The method of claim 6, wherein, when the identification information of the external device is transmitted to the host device during the predetermined time, the identification information of the host device is identified to determine whether an identity of the host device has an authenticated qualification, and a connection is released when the identity of the host device does not have the authenticated qualification.

8. The method of claim 7, wherein the authenticated qualification comprises an identical service provider.

9. The method of claim 8, wherein information of a Vendor ID (VID) and a Product ID (PID) identify the identical service provider.

10. A non-transitory computer readable storage medium encoded with instructions to perform the method of claim 6.

11. A host device configured to perform a BLUETOOTH (BT) communication connection with an external device, the host device comprising:
   a BT communication unit configured to perform BT communication with the external device which performs a Human Interface Device (HID) profile-based BT communication; and
   a controller configured to control a BT communication unit so as to control an overall operation of the BT communication, to control an establishment, by performing a general BT pairing process, the BT communication connection with the external device, to determine whether an identity of the external device comprises an authenticated qualification depending on identification information of the external device, to control an operation of transmitting, by the host device, predetermined identification information to the external devices and performing the BT communication with the external device when the external device comprises the authenticated qualification, and to control an operation of performing the BT communication with the external device without transmitting the predetermined identification information to the external device.

12. The host device of claim 11, wherein the host device comprises a portable terminal configured to support a mobile communication function.

13. The host device of claim 11, wherein the authenticated qualification comprises an identical service provider.

14. The host device of claim 13, wherein information of a Vendor ID (VID) and a Product ID (PID) identify the identical service provider.

15. The host device of claim 11, wherein the identification information of the device to be connected comprises information of a Vendor ID (VID) and a Product ID (PID).

16. An external device configured to perform a BLUETOOTH (BT) communication connection with a host device, the external device comprising:
 a BT communication unit configured to perform BT communication with the host device according to a Human Interface Device (HID) profile-based BT communication; and
 a controller configured to control a BT communication unit so as to control an overall operation of BT communication, to control an establishment, by performing a general BT pairing process, of the BT communication connection with the host device, to release the BT communication connection and power off the external device when identification information of a corresponding host device has not been transmitted during a predetermined time after a BT communication connection according to a host device and a predetermined communication profile, and to control an operation of performing the BT communication when the identification information of the host device has been transmitted.

17. The external device of claim 16, wherein when the identification information of the external device is transmitted to the host device during the predetermined time, the controller controls an operation of identifying the identification information of the host device to determine whether an identity of a corresponding host device comprises an authenticated qualification, and of releasing the connection when the identity of the host device does not comprise the authenticated qualification.

18. The external device of claim 17, wherein the authenticated qualification comprises an identical service provider.

19. The external device of claim 18, wherein information of a Vendor ID (VID) and a Product ID (PID) identify the identical service provider.

* * * * *